United States Patent
Laskaris

(12) 
(10) Patent No.: US 6,553,773 B2
(45) Date of Patent: Apr. 29, 2003

(54) CRYOGENIC COOLING SYSTEM FOR ROTOR HAVING A HIGH TEMPERATURE SUPER-CONDUCTING FIELD WINDING

(75) Inventor: Evangelos Trifon Laskaris, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/854,943

(22) Filed: May 15, 2001

(65) Prior Publication Data

US 2002/0170298 A1 Nov. 21, 2002

(51) Int. Cl.[7] .................. F25D 17/02; F25D 23/12; F17C 5/02; F28D 15/00
(52) U.S. Cl. .................. 62/64; 62/259.2; 62/47.1; 165/204.21
(58) Field of Search .................. 62/64, 259.2, 47.1, 62/50.2, 50.7, 51.1; 165/104.21, 104.33

(56) References Cited

U.S. PATENT DOCUMENTS

| | | | |
|---|---|---|---|
| 4,204,134 A | 5/1980 | Fritz et al. | |
| 4,280,071 A | 7/1981 | Eckels | |
| 4,745,760 A | * 5/1988 | Porter | 62/50.7 |
| 4,816,708 A | 3/1989 | Laumond | |
| 5,532,663 A | 7/1996 | Herd et al. | |
| 5,548,168 A | 8/1996 | Laskaris et al. | |
| 5,586,437 A | * 12/1996 | Blecher et al. | 62/47.1 |
| 5,672,921 A | 9/1997 | Herd et al. | |
| 5,774,032 A | 6/1998 | Herd et al. | |
| 5,777,420 A | 7/1998 | Gamble et al. | |
| 5,798,678 A | 8/1998 | Manlief et al. | |
| 5,848,532 A | * 12/1998 | Gamble et al. | 62/48.2 |
| 5,953,224 A | 9/1999 | Gold et al. | |
| 6,066,906 A | 5/2000 | Kalsi | |
| 6,123,119 A | * 9/2000 | Okumura | 141/34 |
| 6,131,647 A | * 10/2000 | Suzuki et al. | 165/104.33 |
| 6,140,719 A | 10/2000 | Kalsi | |
| 6,169,353 B1 | 1/2001 | Driscoll et al. | |
| 6,173,577 B1 | 1/2001 | Gold | |
| 6,376,943 B1 | 4/2002 | Gamble et al. | |
| 2003/0010039 A1 | 1/2003 | Maguire et al. | |

* cited by examiner

Primary Examiner—William C. Doerrler
(74) Attorney, Agent, or Firm—Nixon & Vanderhye, P.C.

(57) ABSTRACT

A cooling fluid system is disclosed for providing cryogenic cooling fluid to a high temperature super-conducting rotor comprising: a cryogen storage tank storing a liquid cryogenic cooling fluid; an inlet transfer line connecting the storage tank to the rotor and forming a passage for liquid cooling fluid to pass from the tank to the rotor, wherein said storage tank is elevated above the rotor and the liquid cooling fluid is gravity fed to the rotor.

4 Claims, 3 Drawing Sheets

CRYOGENIC COOLING SYSTEM FOR ROTOR HAVING A HIGH TEMPERATURE SUPER-CONDUCTING FIELD WINDING

RELATED APPLICATIONS

This application is related to the following commonly-owned and commonly-filed applications (the specifications and drawings of each are incorporated herein):

U.S. patent application Ser. No. 09/854,932 entitled "Superconducting Synchronous Machine Having Rotor And A Plurality Of Super-Conducting Field Coil Windings", filed May 15, 2001;

U.S. patent application Ser. No. 09/854,933 entitled "HIGH TEMPERATURE SUPER-CONDUCTING ROTOR COIL SUPPORT WITH SPLIT COIL HOUSING AND ASSEMBLY METHOD", filed May 15, 2001;

U.S. patent application Ser. No. 09/854,931 entitled "Synchronous Machine Having Cryogenic Gas Transfer Coupling To Rotor With Super-Conducting Coils", filed May 15, 2001;

U.S. patent application Ser. No. 09/855,026 entitled "High Temperature Super-Conducting Synchronous Rotor Coil Support With Tension Rods And Method For Assembly Of Coil Support", filed May 15, 2001;

U.S. patent application Ser. No. 09/854,946 entitled "High Temperature Super-Conducting Rotor Coil Support With Tension Rods And Bolts And Assembly Method", filed May 15, 2001;

U.S. patent application Ser. No. 09/854,939 entitled "High Temperature Super-Conducting Coils Supported By An Iron Core Rotor", filed May 15, 2001;

U.S. patent application Ser. No. 09/854,938 entitled "High Temperature Super-Conducting Synchronous Rotor Having An Electromagnetic Shield And Method For Assembly", filed May 15, 2001;

U.S. patent application Ser. No. 09/854,940 entitled "High Temperature Super-Conducting Rotor Coil Support And Coil Support Method", filed May 15, 2001;

U.S. patent application Ser. No. 09/854,937 entitled "High Temperature Super-Conducting Rotor Having A Vacuum Vessel And Electromagnetic Shield And Method For Assembly", filed May 15, 2001;

U.S. patent application Ser. No. 09/854,944 entitled "A High Power Density Super-Conducting Electric Machine", filed May 15, 2001;

U.S. patent application Ser. No. 09/854,464 entitled "High Temperature Super-Conducting Racetrack Coil", filed May 15, 2001; and U.S. patent application Ser. No. 09/855,034 entitled "High Temperature Super Conducting Rotor Power Leads", filed May 15, 2001.

BACKGROUND OF THE INVENTION

The present invention relates generally to a cryogenic cooling system for synchronous machine having a rotor with a high temperature superconducting (HTS) coil. More particularly, the present invention relates to an evaporative cooling system to provide cryogenic fluid to the rotor and to re-cool used cooling fluid returned from the rotor.

High temperature super-conducting generators require highly reliable, low cost cryorefrigeration equipment in order to be viable as commercial products. To achieve high reliability with existing cryorefrigeration equipment involves redundant cryorefrigerator components. The inadequate reliability of these components and the requirement that HTS rotors have an uninterrupted supply of cooling fluid necessitates that redundant components be included in cryorefrigeration systems for HTS rotors.

However, the cost of cryorefrigeration systems is substantially increased due to the need for redundant cryorefrigerator components. Moreover, existing cryorefrigeration systems require frequent maintenance due to their inadequate reliability and system redundancies. Accordingly, the operating cost of these systems is relatively high.

The purchase and operating costs of existing cryorefrigeration systems significantly adds to the cost of machines having HTS rotors. These high costs have contributed to the heretofore commercial impracticalities of incorporating HTS rotors into commercially marketable synchronous machines. Accordingly, there is a substantial and previously unmet need for cryorefrigeration systems that are less expensive, inexpensive to operate and provide a reliable supply of cryogenic cooling fluid to a HTS rotor.

Synchronous electrical machines having field coil windings include, but are not limited to, rotary generators, rotary motors, and linear motors. These machines generally comprise a stator and rotor that are electromagnetically coupled. The rotor may include a multi-pole rotor core and coil windings mounted on the rotor core. The rotor cores may include a magnetically-permeable solid material, such as an iron forging.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at air-gap magnetic field strength of about 2 Tesla. Known super-conductive rotors employ air-core designs, with no iron in the rotor, to achieve air-gap magnetic fields of 3 Tesla or higher, which increase the power density of the electrical machine and result in significant reduction in weight and size. Air-core super-conductive rotors, however require large amounts of super-conducting wire, which adds to the number of coils required, the complexity of the coil supports, and the cost.

Super-conductive rotors have their super-conducting coils cooled by liquid helium, with the used helium being returned as room-temperature gaseous helium. Using liquid helium for cryogenic cooling requires continuous reliquefaction of the returned, room- temperature gaseous helium, and such reliquefaction poses significant reliability problems and requires significant auxiliary power. Accordingly, there is a need for a cryogenic cooling system that reliquefies the hot, used cooling fluid returned from the rotor. The reliquefied cooling fluid should then be available for reuse as a HTS rotor cooling fluid.

BRIEF SUMMARY OF THE INVENTION

A highly reliable cryogenic cooling system has been developed for a HTS rotor for a synchronous machine. The cooling system provides a steady supply of cooling fluid to an HTS rotor. Moreover, the cooling system is economical in its construction and operation. The reliability and economy of the cooling system facilitates the development of a commercially viable synchronous machine with a HTS rotor.

The cryogenic cooling system is a gravity fed close-loop evaporative cooling system for high temperature super-conducting (HTS) rotor. The system comprises an elevated cryogen storage tank, vacuum jacketed transfer lines that supply liquid cryogen to the rotor and return vapor to the storage tank, and a cryorefrigerator in the vapor space of the storage tank that recondenses the vapor. The cryorefrigerator may be a single stage Gifford-McMahon cryocooler or pulse tube with separate or integral compressor. The cryogenic fluid may be neon, hydrogen or other such cooling fluid.

In a first embodiment, the invention is a cooling fluid system for providing cryogenic cooling fluid to a high temperature super-conducting rotor comprising: a cryogen storage tank storing a liquid cryogenic cooling fluid; an inlet transfer line connecting the storage tank to the rotor and forming a passage for liquid cooling fluid to pass from the tank to the rotor, wherein the storage tank is elevated above the rotor and the liquid cooling fluid is gravity fed to the rotor.

In another embodiment, the invention is a cooling fluid system coupled to a high temperature super-conducting rotor for a synchronous machine and a source of cryogenic cooling fluid comprising: a cryogenic storage tank and a supply of cryogenic cooling fluid stored in the tank, wherein the tank is elevated above the rotor; an inlet line providing a fluid passage for the cooling fluid between the tank an the rotor; a return line providing a fluid passage for the cooling fluid between the rotor and tank, and a cryorefrigerator cooling the fluid in the storage tank.

In a further embodiment, the invention is a method for cooling a super-conducting field winding coil in a rotor of a synchronous machine using an elevated cryogen storage device comprising the steps of: storing cryogenic cooling fluid in the tank, wherein the tank is elevated above the rotor; allowing the cooling fluid to flow under the force of gravity from the tank to the rotor; cooling the field winding coil with the cooling fluid, and returning the cooling fluid to the tank.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
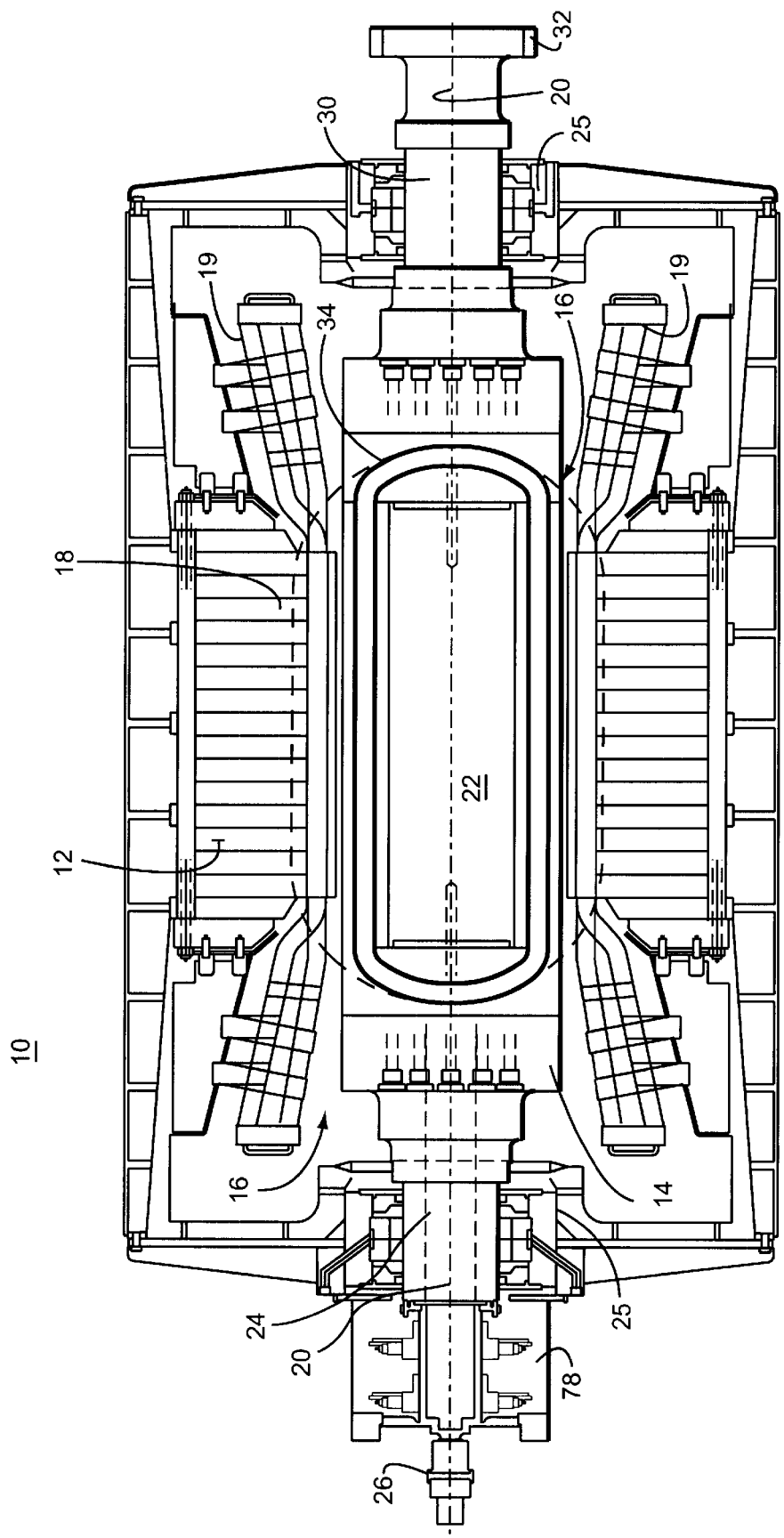
FIG. 1 is a schematic side view of schematic super-conductive (SC) rotor shown within a stator.

FIG. 1 shows an exemplary synchronous generator machine 10 having a stator 12 and a rotor 14. The rotor includes field winding coils 34 that fit inside the cylindrical rotor vacuum cavity 16 of the stator. The rotor 14 fits inside the rotor vacuum cavity 16 of the stator. As the rotor turns within the stator, a magnetic field 18 (shown by dotted lines) generated by the rotor and rotor coils moves through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferro-magnetic material, such as iron. In a low power density super-conducting machine, the iron core of the rotor is used to reduce the magnetomotive force (MMF), and, thus, minimize the coil winding usage. For example, the iron of the rotor can be magnetically saturated at an air-gap magnetic field strength of about 2 Tesla.

The rotor 14 supports a generally longitudinally-extending, race-track shaped high temperature super-conducting (HTS) coil winding. HTS coil winding may be alternatively a saddle-shape coil or have some other coil winding shape that is suitable for a particular HTS rotor design. The cooling system disclosed here may be adapted for coil winding and rotor configurations other than a racetrack coil mounted on a solid core rotor.

The rotor includes end shafts 24, 30 that bracket the core 22 and are supported by bearings 25. The collector end shaft 24 has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The collector end shaft may also include collector rings 78 to connect the rotor coil 34 to an external electrical device or power supply. The drive end shaft 30 may be a power turbine coupling 32.

Figure 2:
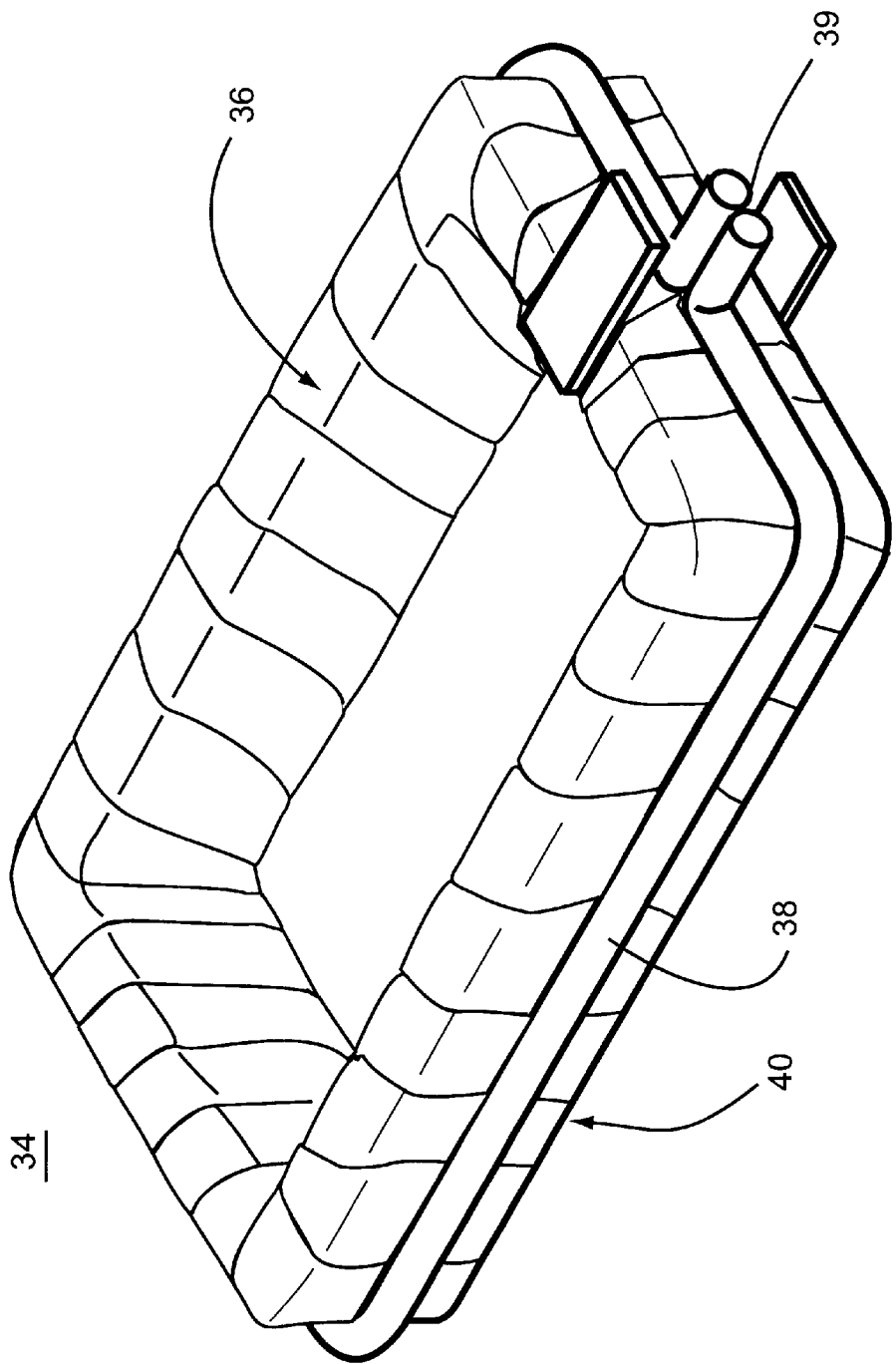
FIG. 2 is a schematic perspective view of a race-track SC coil having cooling gas passages.

FIG. 2 shows an exemplary HTS race-track field coil winding 34. The SC field winding 34 of the rotor includes a high temperature super-conducting coil 36. Each HTS coil includes a high temperature super-conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

HTS wire is brittle and easy to be damaged. The HTS coil is typically layer wound with HTS tape, then epoxy impregnated. The HTS tape is wrapped in a precision coil form to attain close dimensional tolerances. The tape is wound around in a helix to form the race-track SC coil 36.

The dimensions of the race-track coil are dependent on the dimensions of the rotor core. Generally, each race-track coil encircles the magnetic poles of the rotor core, and is parallel to the rotor axis. The HTS coil windings are continuous around the race-track. The coils form a resistance free current path around the rotor core and between the magnetic poles of the core.

Fluid passages 38 for cryogenic cooling fluid are included in the coil winding 34. These passages may extend around an outside edge of the SC coil 36. The passageways provide cryogenic cooling fluid to the coils and remove heat from those coils. The cooling fluid maintains the low temperatures, e.g., 27° K., in the SC coil winding needed to promote super-conducting conditions, including the absence of electrical resistance in the coil. The cooling passages have input and output ports 39 at one end of the rotor core. These ports 39 connect to cooling passages 38 on the SC coil to the cryogen transfer coupling 26.

Figure 3:
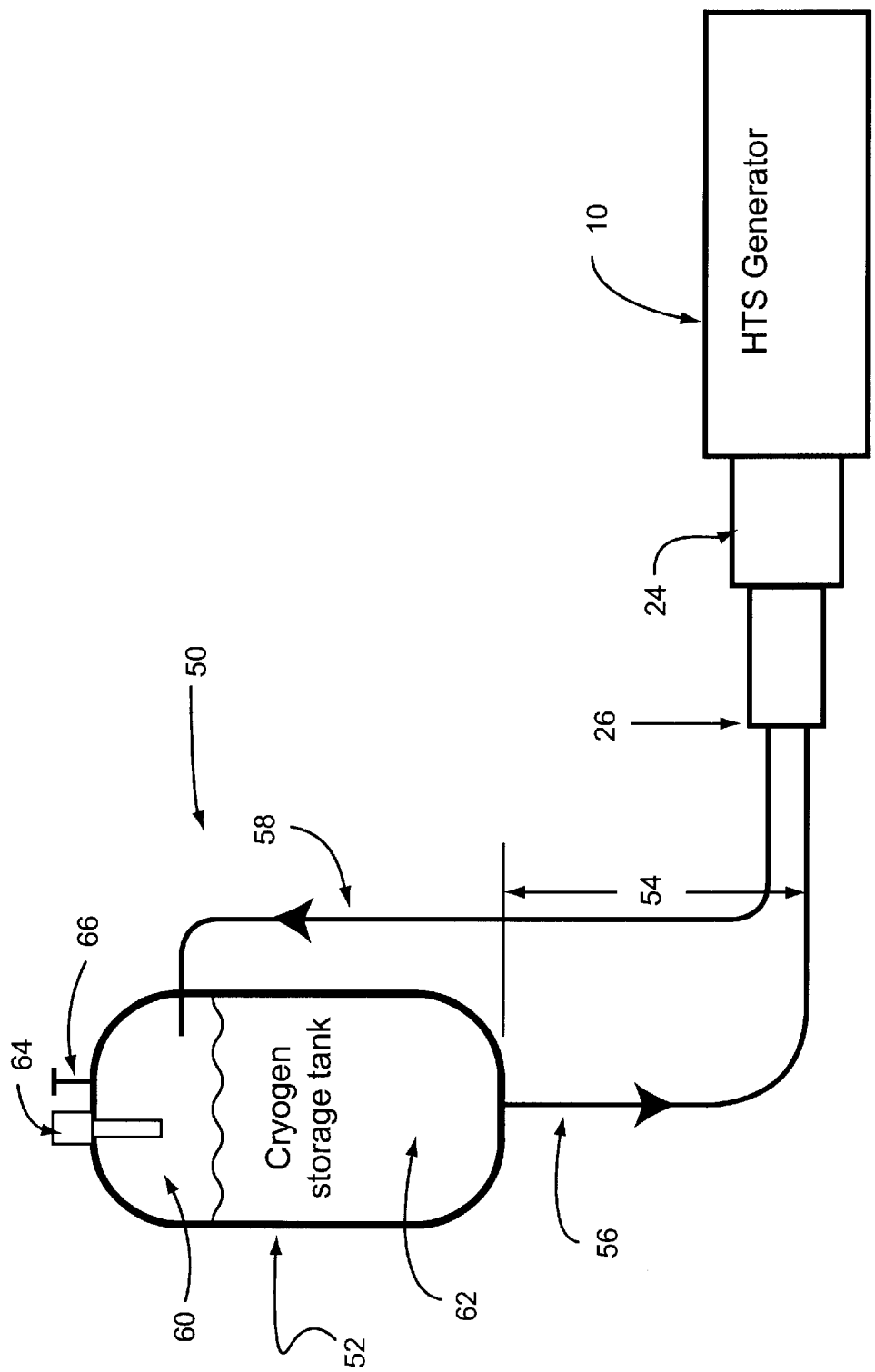
FIG. 3 is a schematic diagram of a cryogenic cooling system to supply cooling fluid to a SC rotor.

FIG. 3 is a schematic of a cryorefrigeration system 50 for a HTS generator 10. A storage cryogenic tank 52 or dewar stores liquid cryogen. The tank is positioned at an elevated height 54 relative to the HTS generator. The height of the tank above the rotor is proportional to the required pressure of cooling fluid entering the rotor, and inversely proportional to the density of the cooling fluid. Due to the height of the tank, gravity forces cooling fluid from the cooling tank into the rotor coupling 26 and into the SC coils 34. Gravity does not fail, does not require maintenance, and is free. Accordingly, the gravity-fed cooling system is highly reliable and economical.

The cooling system is a closed-loop system. Cooling fluid from the tank 52 flows through an inlet transfer 56 that connects the tank to the rotor coupling 26. The cooling fluid passes through vacuum jacketed cooling passages in the end shaft 24 and through the cooling passages 38 around the SC coils 36. The cooling fluid maintains the coil at cryogenic temperatures by evaporative cooling and ensures that the coils operate in super-conducting conditions. Used cooling fluid, typically in the form of cold gas, exits the cooling passage 38 from the coil, flows through the vacuum jacketed passages in the end shaft and through the cooling coupling.26. A return transfer line 58 carries the return cooling fluid from the rotor to the storage tank 52. The inlet and transfer lines are vacuum jacketed and thus heavily insulated. The vacuum insulation of the transfer lines minimizes heat transfer losses in the cooling fluid as it flows from the tank to the rotor, and from the rotor to the tank.

The cooling fluid is usually inert, such as neon or hydrogen. Temperatures that are suitable for HTS superconductors are generally below 30° and preferably around 27° K. Cryogenic fluids most suitable to cool the SC coils in the HTS rotor are hydrogen which may cool a coil to 20° K., and neon which may cool the SC coil at 27° K. Liquid neon exits the cryorefrigerator tank 52 at a temperature around 27° K., for example. Liquid cryogen is generally used in the storage tank 52 to supply the HTS rotor with liquid cooling fluid. The vacuum jacketed inlet transfer line ensures that the liquid cooling fluid from the storage tank enters the rotor at substantially the same temperature as the fluid left the tank.

The cooling liquid evaporates as it flows around the SC coils. The evaporation of the cooling fluid cools the SC coils and ensures that the coils operate in super-conducting conditions. The evaporated cooling fluid flows as a cold gas from the HTS rotor, through the return line 58 to the cooling tank 52. The return line is sized to pass the cold cooling gas from the rotor into an upper vapor region 60 of the tank 52. The vapor area of the tank is vertically above a liquid region 62 of the tank. The vapor region and liquid region of the tank may be a single continuous volume in the tank, or they may be separate compartments in fluid communication with each other.

Reliquefication of the gaseous cooling fluid in the storage tank is performed by a cold-head recondenser 64. The recondenser extracts heat from the gaseous cooling fluid in the tank so that the fluid condenses into its liquid form and flows down into the liquid area of the tank. The recondenser need not operate continuously as the tank has a supply of liquid cooling fluid for the HTS rotor. The liquid cooling fluid in the tank provides an uninterruptible supply of cooling fluid for the HTS rotor. Thus, the recondenser may be serviced while the HTS generator continues uninterrupted operation. The recondenser may temporarily fail without necessitating that the HTS rotor be shut down while the recondenser is repaired. When the HTS rotor is shut down for normal service the tank can be serviced via a service stack 66.

The cryorefrigerator 64 may comprise one or more Gifford-McMahon or pulse-tube cold-head units, as required to meet the refrigeration capacity of the HTS rotor. The cryorefrigerator may be a recondenser that condenses vapor to liquid. Redundant cryorefrigeator units should not be generally necessary. Excess capacity for the cryorefrigerator is not needed because the cryogen storage tank has sufficient storage capacity of liquid cooling fluid to allow the condensing refrigeration units 64 to be shut down for maintenance or replacement without affecting the operation of the rotor. The storage volume of the tank is sized to provide sufficient liquid to the rotor over the period of time that the recondenser is shut down, one day for example, in which case the typical storage capacity for a HTS rotor cooled with neon would be about 100 liters. During periods when the cryorefrigerator is shut down, the cooling system operates in an open-loop such that the cooling fluid vapor returned from the rotor is discharged to the outside atmosphere via a service stack vent 66. Lost cryogen liquid is replenished by refilling the storage tank after the cryorefrigerator is back in operation.

In operation, liquid cryogen is gravity fed from the liquid area 62 of the storage tank 52 through the vacuum jacketed transfer input line 56 to the transfer coupling 26 of the super-conducting rotor. The cooling liquid circulates through the heat exchanger tubing 38 in contact with the outside of the HTS coil, and thereby cools the coil 36 by boiling heat transfer. The gaseous cooling vapor returns from the rotor transfer coupling 26 through the vacuum jacketed return transfer line 58 to the top (vapor region 60) of the storage tank. The driving force that circulates the cooling fluid through the closed-loop system is the pressure difference that results from the heavy liquid inlet column height 54 compared to the light gaseous return column height 54.

The cryorefrigerator cold head 64 operates in the vapor space 60 of the storage tank to recondense the vapor. By recondensing the cooling fluid, the fluid returns to the liquid region of the tank and is available for reuse to cool the HTS rotor. The system is a closed-loop system that reuses the cooling fluid and avoids leakage of the fluid. However, the system may operate as an open-loop system if the cryorefrigerator is not operating. Moreover, the proposed rotor cooling system can be used effectively to cool down the rotor in open-loop mode of operation by pressurizing the storage tank vapor space to force more liquid through the rotor as required for rapid cool-down.

The cooling system 50 is economical and reliable. The system relies on gravity and a tank of cooling liquid to provide an uninterrupted supply of cooling fluid, in an inexpensive manner. The system further minimizes potential failure by ensuring that service intensive systems, such as the cryorefrigeration is not needed for continuous operation.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A method for cooling a super-conducting field winding coil in a rotor of a synchronous machine using an elevated cryogen storage device comprising:
   a. storing cryogenic cooling fluid in the tank, wherein the tank is elevated above the rotor;
   b. allowing the cooling fluid to flow under the force of gravity from the tank to the rotor;
   c. cooling the field winding coil with the cooling fluid;
   d. returning the cooling fluid to the tanks;
   e. condensing a vapor portion of the cooling fluid in the tank or in the return line;
   f. interrupting step (e) and ceasing condensing of the vapor portion of the cooling fluid;
   g. during step (f) continuing the flow of cooling fluid from the tank to the rotor.

2. A method as in claim 1 further comprising the step of venting the vapor portion during step (f).

3. A method as in claim 1 further comprising the steps of:
   h. during step (f), increasing a pressure of the cooling fluid in the tank.

4. A method as in claim 3 wherein step (h) is performed during a cool-down phase of the rotor.

* * * * *